United States Patent [19]

Athans et al.

[11] Patent Number: 5,066,035
[45] Date of Patent: Nov. 19, 1991

[54] TRAILER BEARING PLATE FOR FIFTH WHEEL

[76] Inventors: Leonidas Athans, 463 Witshire Ln.; George C. Athans, 740 St. Andrews Ln., both of Crystal Lake, Ill. 60014

[21] Appl. No.: 511,391

[22] Filed: Apr. 18, 1990

[51] Int. Cl.⁵ .................................... B62D 53/06
[52] U.S. Cl. ........................ 280/441.1; 280/433; 384/421
[58] Field of Search ............ 280/433, 438.1, 441, 280/441.1; 384/421

[56] References Cited

U.S. PATENT DOCUMENTS

| | | | |
|---|---|---|---|
| 2,508,610 | 10/1946 | Kendall | 280/125 |
| 3,174,812 | 2/1963 | Widmer | 308/136 |
| 3,337,277 | 10/1965 | Arnold | 308/136 |
| 3,511,523 | 6/1968 | Fuller | 280/433 |
| 3,622,173 | 11/1971 | Hodgson | 280/433 X |
| 3,704,924 | 12/1972 | Lowry | 308/136 |
| 3,887,251 | 6/1975 | McKay | 280/433 X |
| 3,924,909 | 12/1975 | Kent et al. | 308/136 |
| 4,121,853 | 10/1978 | McKay | 280/433 |
| 4,457,531 | 7/1984 | Hunger | 280/433 |
| 4,946,184 | 8/1990 | Larocco | 280/433 |

FOREIGN PATENT DOCUMENTS 1037871  8/1958  Fed. Rep. of Germany ...... 280/433

Primary Examiner—Charles A. Marmor
Assistant Examiner—Alan M. Kagen
Attorney, Agent, or Firm—Wallenstein, Wagner & Hattis, Ltd.

[57] ABSTRACT

An assembly for coupling a tractor to a trailer comprising a fifth wheel bearing plate and a trailer bearing plate assembly. The trailer bearing plate assembly includes a ring having a collar and is adapted to securely attach to an underside of the trailer. The trailer bearing plate further includes a disk disposed between the collar and the trailer underside.

6 Claims, 2 Drawing Sheets

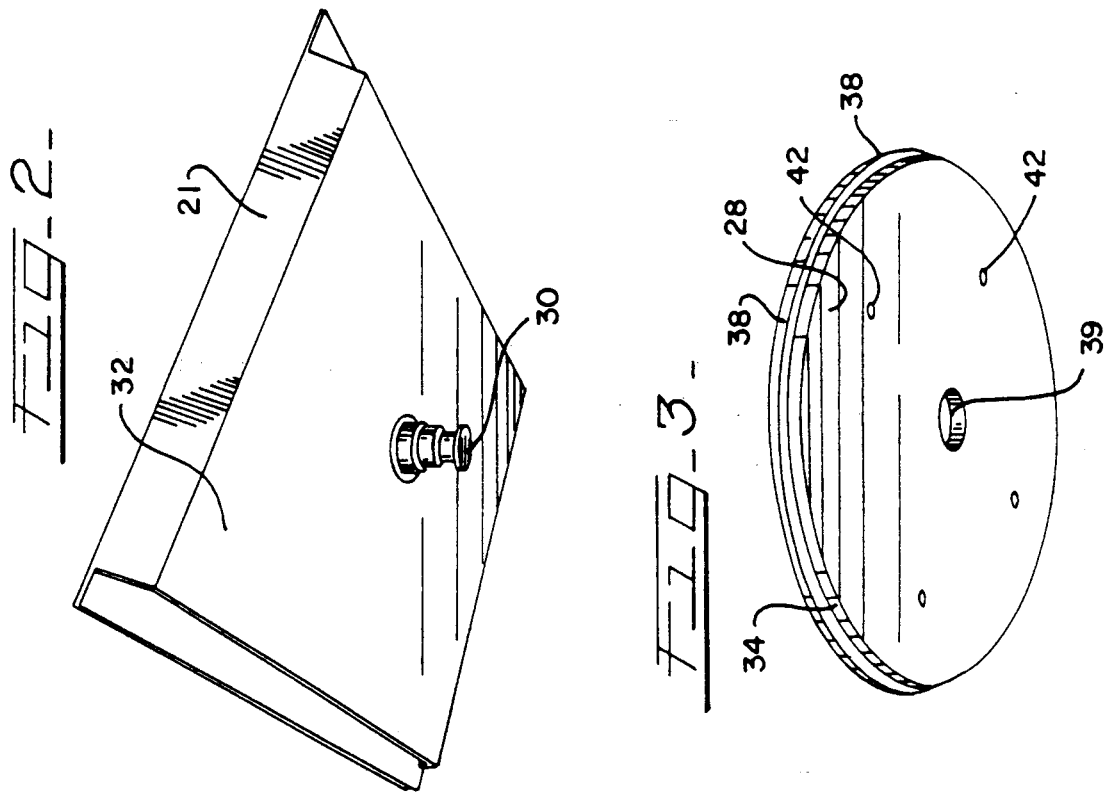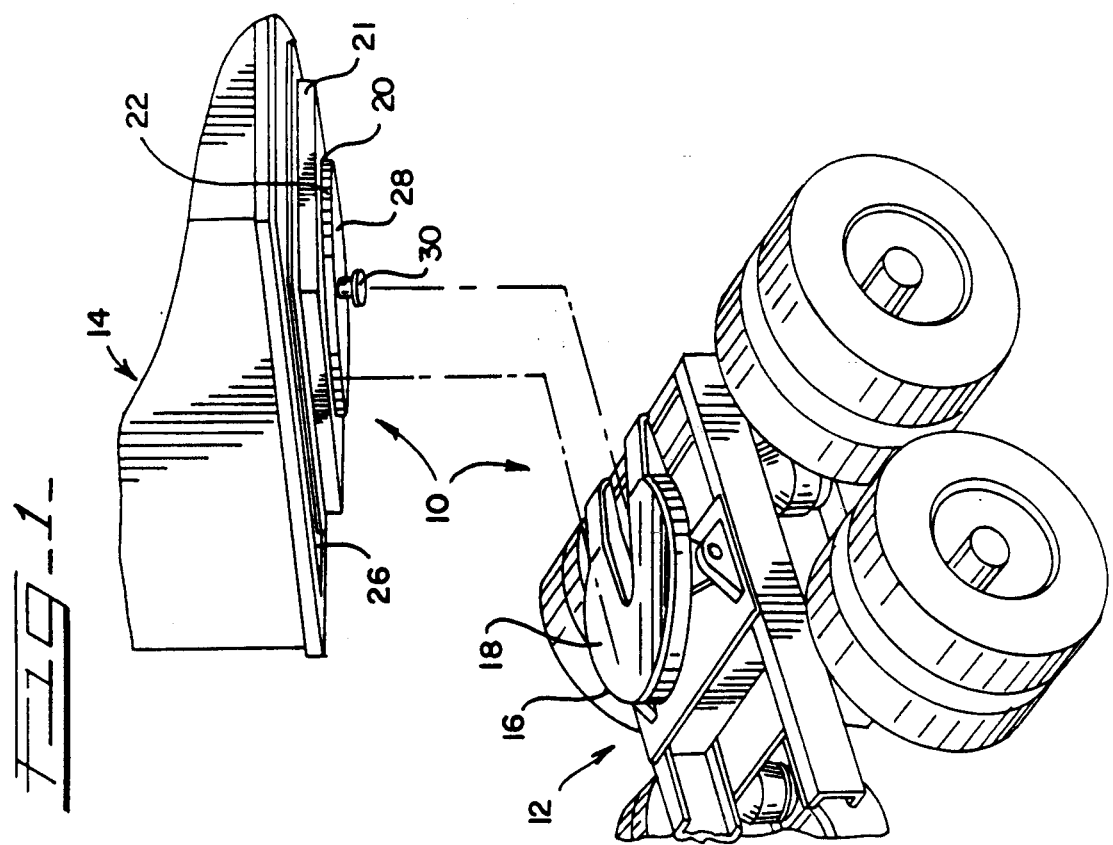

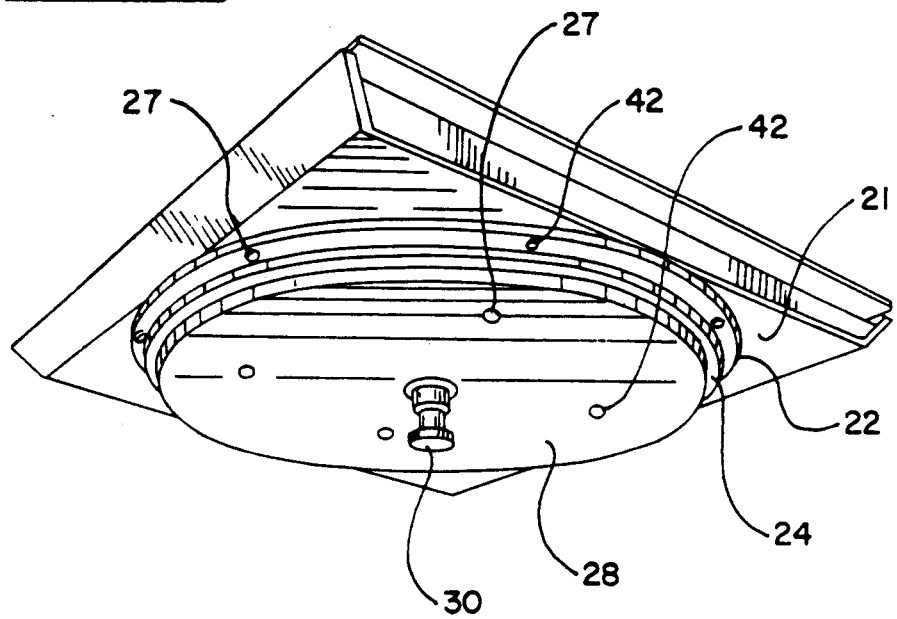
FIG-4-
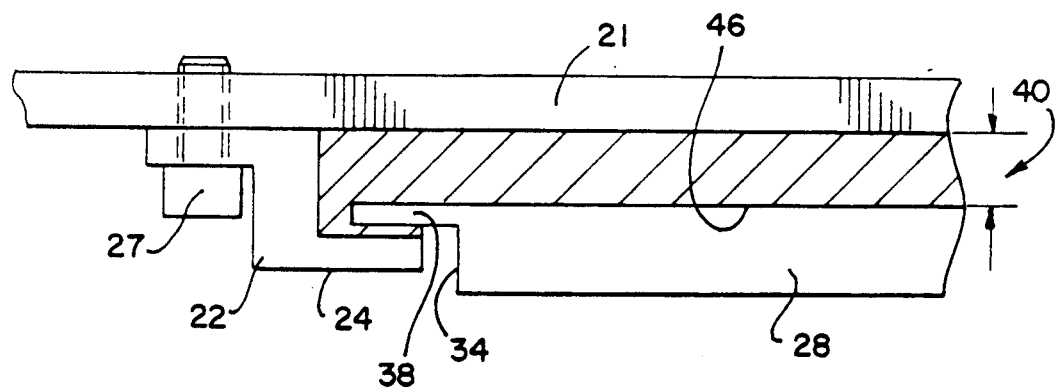
FIG-5-
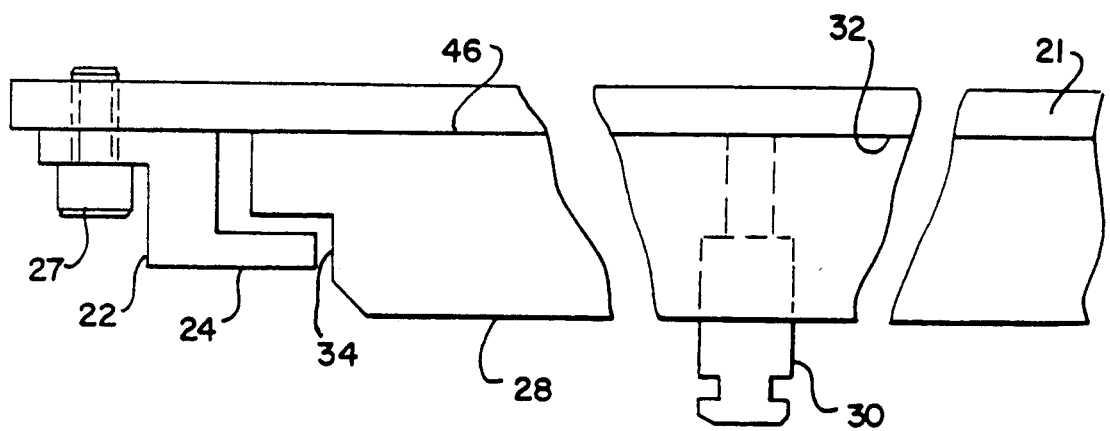
FIG-6-

TRAILER BEARING PLATE FOR FIFTH WHEEL

DESCRIPTION

TECHNICAL FIELD

The present invention relates generally to a fifth wheel assembly for coupling an over-the-road truck tractor to a semi-trailer, and more particularly to an improved semi-trailer bearing plate assembly for use with a fifth wheel coupler.

BACKGROUND OF THE INVENTION

Conventionally, truck tractors have been coupled to a semi-trailer by a coupling device commonly referred to as a "fifth wheel". Accordingly, the truck tractor has a "fifth wheel" comprising a substantially round flat plate positioned in a substantially horizontal plane to form a tractor bearing surface. The semi-trailer includes a king pin extending downwardly to locate and seat within a slot in the fifth wheel of the tractor. The trailer further includes a trailer bearing surface to match the tractor bearing surface. Once coupled, the tractor and trailer can pivot about the king pin to permit the truck and trailer to articulate when turning. Because the tractor bearing plate necessarily bears a large portion of the trailer weight, much friction between the two bearing surfaces is developed. This friction adversely affects handling, increases tire wear, fatigues the driver, and causes damage and structural cracks to crossmembers, frame rails and to the suspension systems.

In order to reduce this friction, a lubricant such as grease has been placed between the truck tractor and semi-trailer bearing surfaces. However, it is difficult to maintain a satisfactory layer of grease between the two bearing surfaces, thus requiring the grease to be often replenished. In addition, grease is very messy, attracts dirt and falls from the tractor to the road surface, thus becoming a hazard to vehicles. Further, as the grease dissipates, the handling and performance characteristics of the truck tractor and semi-trailer deteriorate such that oversteer is experienced.

As one way to eliminate the need for a layer of grease, bearings, ball or roller, have been utilized to permit the tractor bearing surface itself to rotate. However such coupling devices are relatively complex, expensive, heavy and difficult to maintain.

Still others have replaced the layer of grease with a substrate having a low coefficient of friction, such as Teflon ® or various plastics, secured as a cover to the tractor bearing surface. Such covers are disclosed in U.S. Pat. No. 4,542,912 to St. Louis and U.S. Pat. No. 4,169,635 to Szalay. However, these covers are unprotected and are still subject to wear. Further, upon accumulating road dirt or thin surfaces, these covers become ineffective.

Additionally, when pulling an empty trailer, especially one of today's lightweight aluminum trailers, the trailer bearing surface tends to bounce on the tractor bearing surface. This vibration is transmitted into the tractor cab, further adding to the fatigue and discomfort of the driver. Likewise, metal fatigue to the truck tractor and semi-trailer increases.

The present invention is provided to solve these and other problems.

SUMMARY OF THE INVENTION

In accordance with the invention, a novel trailer plate assembly for semi-trailers has been developed for a truck tractor fifth wheel. The trailer bearing plate assembly includes a ring having a collar and is adapted to securely attach to a trailer bearing plate housing. The housing is then secured to an underside of the trailer. The trailer bearing plate assembly further includes a disk disposed between the collar and the inner surface of the trailer plate housing.

According to one embodiment of the invention, the disk is formed of either a plastic or steel. A gap is provided between the disk and the inner housing surface. The disk includes a perimeter surface, preferably flanged. Together, the flanged perimeter surface and the collar form a seal to confine a lubricant, such as grease, within the gap. The outer surface of the disk is provided with grease fittings to replenish the gap with grease. In this embodiment, the disk "floats" on a thin layer or veneer of grease. In the operation of this embodiment of the present invention, when the truck tractor turns, it has been observed that the disk does not rotate relative to the fifth wheel bearing plate. Rather, the disk rotates on the layer of grease within the trailer plate housing. Apparently, the frictional engagement between the disk and the fifth wheel surface causes no rotation therebetween but instead imparts rotation of the disk on the inner surface of the trailer plate housing.

Another advantage of the present invention is that the layer of grease isolates and dampens semi-trailer vibrations, minimizing transmission of noise and vibration into the truck tractor cab.

According to another embodiment of the invention, the disk is formed of a plastic, preferably an ultra-high molecular weight polyethylene. In operation of this embodiment, when the truck tractor turns, the disk rotates relative to the inner surface of the trailer plate housing. Forming the disk from such a plastic facilitates coupling of the truck tractor to the semi-trailer. Further, in this embodiment of the invention, it is possible to eliminate or substantially reduce the grease within the gap.

The present invention may be retro-fitted to any existing semi-trailer or provided as an original equipment feature. Further, by use of the present invention, greasing of the surface of the fifth wheel is eliminated and coupling of the tractor and trailer is enhanced.

Other features and advantages of the invention will be apparent from the following specification taken in conjunction with the following drawings.

BRIEF DESCRIPTION OF DRAWINGS

FIG. 1 is a perspective view of a fifth wheel and trailer plate assembly for coupling a truck tractor to a semi-trailer incorporating the present invention;

FIG. 2 is a perspective view of the semi-trailer bearing plate housing of FIG. 1;

FIG. 3 is a perspective view of a disk as used in one embodiment of the invention:

FIG. 4 is a perspective view of the disk of FIG. 3 assembled to the housing of FIG. 3;

FIG. 5 is a partial cross-sectional view of the disk and housing of the embodiment of FIG. 3; and FIG. 6 is a partial cross-sectional view of the disk and housing of another embodiment of the invention.

DETAILED DESCRIPTION

While this invention is susceptible of embodiments in many different forms, there is shown in the drawings and will herein be described in detail, preferred embodiments of the invention with the understanding that the present disclosure is to be considered as exemplifications of the principles of the invention and is not intended to limit the broad aspects of the invention to the particular embodiments illustrated.

A coupling assembly 10 for coupling a tractor 12 to a trailer 14 is illustrated in FIG. 1. The coupling assembly 10 comprises a fifth wheel 16 having a substantially horizontal tractor bearing plate 18, and a trailer bearing plate assembly 20. As known in the art, the tractor bearing plate is slightly rearwardly and downwardly angled to ease coupling of the tractor to the trailer.

The trailer bearing plate assembly 20 includes a housing 21 adapted to securely attach to an underside 26 of the trailer 14, as by welding. The trailer bearing plate assembly 20 further includes a retaining ring 22 having a collar 24. The ring 22 is securely attached to the housing 21 by bolts 27. The trailer bearing plate assembly 20 further includes a disk 28 disposed between the collar 24 and the underside 26 of trailer 14. Additionally, the trailer bearing plate assembly 20 includes a king pin 30. The king pin 30 is attached to the inner housing surface 32 preferably by welding. When coupling the tractor 12 to the trailer 14, the king pin 30 is securely retained by the fifth wheel 16 by a conventional locking mechanism (not shown) well known in the art.

The housing 21 is illustrated in FIG. 2. The housing 21 has an inner housing surface 32 which is precision surface finished, preferably on the order of about 32 microns. The precision finish is necessary because it has been found that when manufacturing the bearing plate assembly 20, warpage results, forming high and low spots on the housing surface 32. These high and low spots can eventually create corresponding high and low spots on the truck tractor bearing plate 18.

The disk 28 as utilized in one embodiment of the invention is illustrated in FIG. 3. The disk 28 includes a perimeter surface 34 terminating with a flange 38. As best disclosed in FIG. 6, an upper surface 46 of the disk 28 has a precision surface finish on the order of about 250 microns. This facilitates the holding of a lubricant layer within the housing and rotation of disk 28 on inner housing surface 32 which will be later explained. The disk 28 is preferably formed from an ultra-high molecular weight polyethylene plastic such as Tivar ® or it may be formed from steel. A Tivar ®disk having a thickness of the order of 1.5" has been found to work satisfactorily. The disk 28 includes a centrally located hole 39 to permit the king pin 30 to extend therethrough. The disk 28 secured to the housing 21 by the collar 24 is illustrated in FIG. 4.

As discussed in greater detail below, two embodiments of the invention are comprehended. In the firs embodiment, the housing surface 32 and the disk 28 are spaced, providing a gap 40 therebetween. The gap is on the order of about 0.125" thick. The gap is filled with a lubricant, such as white lithium grease. Grease fittings 42 are countersunk in the disk 28 permit re-filling of any grease which is lost. According to the second embodiment, the disk 28 is in direct contact with the inner housing surface 32 and gap 40 is essentially eliminated.

The first embodiment of the invention is disclosed in greater detail in FIG. 5. The collar 24 cooperates with the flange 38 of the disk 28 to form a seal to substantially retain the grease G within the gap 40. The seal also minimizes degradation of the grease by keeping out dirt and other contaminants. Preferably, a formable silicone gasket is used to further seal the grease within the gap 40. The disk 28 effectively "floats" or is hydraulically supported by the veneer of grease within gap 40. As a result, when the tractor 12 turns relative to the trailer 14, disk 28 does not rotate relative to the tractor bearing plate 18. Rather, unlike prior art fifth wheel couplers, the disk 28 rotates on the grease within gap 40 within the housing. As a result, little or no abrasion results between the disk 28 and the tractor bearing plate 18. Additionally, the grease-filled gaps results in a marked reduction in cab noise and vibration when hauling an empty trailer. It is believed that this cab noise reduction is the result of the layer of grease isolating trailer vibrations and where disk 28 is formed from plastic. This minimizes noise and vibration transmission into the truck tractor cab.

According to a second embodiment of the invention, as illustrated in FIG. 6, the disk 28 is formed from a high molecular weight polyethylene plastic such as Tivar ®. Disk 28 has an upper disk surface 46 in substantially continuous contact with the inner housing surface 32 thus effectively eliminating a gap 40. As previously explained, upper surface 46 is precision surface finished so that disk 28 easily rotates on housing surface 32. Further, housing surface 32 is also precision finished. Such finish permits the relative rotation of disk surface 46 on trailer plate housing surface 32 as disclosed in FIG. 6.

Hence, the present invention eliminates the need, inconvenience and vehicle handling problems associated with greasing of the fifth wheel surface. As a result, the present invention is relatively maintenance free and tends to minimize noise and vibration transmitted from the semi-trailer to the truck tractor.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An assembly for coupling a truck tractor to a semi-trailer, the assembly comprising:
    an upwardly facing tractor bearing plate; and
    a trailer bearing plate assembly adapted to securely attach to an underside of said trailer, said trailer bearing plate assembly including a downwardly facing disk for engagement with said upwardly facing tractor bearing plate and having a peripheral flanged edge, said trailer bearing plate assembly further including a ring secured to an underside of said trailer, said ring having an inwardly directed collar retainingly extending only about said disk peripheral flanged edge to permit said tractor bearing plate to rotate independent of said ring.

2. The assembly of claim 1 including a layer of grease disposed between said disk and said trailer underside.

3. The assembly of claim 1 wherein said disk includes a grease fitting for permitting introduction of grease between said disk and said trailer underside.

4. The assembly of claim 1 wherein said disk is formed of plastic.

5. The assembly of claim 4 wherein said plastic has a low coefficient of friction.

6. The assembly of claim 5 wherein said plastic includes a high molecular weight poly ethylene.

* * * * *